United States Patent
Aurongzeb et al.

(10) Patent No.: US 10,686,800 B2
(45) Date of Patent: Jun. 16, 2020

(54) SYSTEM AND METHOD OF UTILIZING AUGMENTED REALITY IN VARIOUS CONTEXTS

(71) Applicant: Dell Products L.P., Round Rock, TX (US)

(72) Inventors: Deeder M. Aurongzeb, Austin, TX (US); Michiel Sebastiaan Emanuel Petrus Knoppert, Amsterdam (NL); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 176 days.

(21) Appl. No.: 16/031,796

(22) Filed: Jul. 10, 2018

(65) Prior Publication Data
US 2020/0021601 A1    Jan. 16, 2020

(51) Int. Cl.
*H04L 29/06* (2006.01)
*G06F 16/11* (2019.01)
*G06T 19/00* (2011.01)

(52) U.S. Cl.
CPC .......... *H04L 63/107* (2013.01); *G06F 16/122* (2019.01); *G06T 19/006* (2013.01)

(58) Field of Classification Search
CPC ................................................. H04L 63/107
See application file for complete search history.

(56) References Cited

U.S. PATENT DOCUMENTS

| | | | | |
|---|---|---|---|---|
| 2011/0040870 A1* | 2/2011 | Wynn | ................. | H04L 63/0428 709/224 |
| 2011/0191862 A1* | 8/2011 | Mandava | .............. | H04W 12/08 726/28 |
| 2011/0239276 A1* | 9/2011 | Garcia Garcia | .. | H04W 12/0608 726/4 |
| 2011/0252464 A1* | 10/2011 | Sanjeev | ................ | H04L 63/107 726/7 |
| 2012/0058774 A1* | 3/2012 | Kim | ...................... | H04L 63/107 455/456.1 |
| 2015/0057026 A1* | 2/2015 | Mikan | ..................... | H04L 63/08 455/456.3 |

(Continued)

OTHER PUBLICATIONS

Payet, Nadia, and Sinisa Todorovic. "Scene shape from texture of objects." *Computer Vision and Pattern Recognition (CVPR)*, 2011 IEEE Conference on. IEEE, 2011; 8 pages.

(Continued)

*Primary Examiner* — Ponnoreay Pich
(74) *Attorney, Agent, or Firm* — Baker Botts L.L.P.

(57) ABSTRACT

In one or more embodiments, one or more systems, method, and/or processes may load first multiple policy settings from a policy file; may determine, via one or more sensors, one or more of a location and a physical context of a user; may determine a security level based at least on the first multiple policy settings and the one or more of the location and the physical context of the user; may receive data via a wireless interface; may determine, based at least on the security level, if the data shall be displayed; if so: may display the data via a first portion of a display; otherwise: may determine information associated with the data; and may display the information associated with the data via a second portion of the display.

20 Claims, 7 Drawing Sheets

(56) References Cited

U.S. PATENT DOCUMENTS

2018/0108003 A1* 4/2018 Todasco ............. G06Q 20/4014
2018/0341766 A1* 11/2018 Anagnostopoulos ... G06F 21/45
2020/0021601 A1* 1/2020 Aurongzeb ........... H04L 63/105

OTHER PUBLICATIONS

Ortis, Alessandro, and Sebastiano Battiato. "A new fast matching method for adaptive compression of stereoscopic images." *Three-Dimensional Image Processing, Measurment (3DIPM), and Applications 2015*. vol. 9393. International Society for Optics and Photonics, 2015; 8 pages.

Ortis, Alessandro, et al. "Adaptive compression of stereoscopic images." *International Conference on Image Analysis and Processing*. Springer, Berlin, Heidelberg, 2013; 9 pages.

Kot, Tomáš, and Petr Novák. "Application of virtual reality in teleoperation of the military mobile robotic system TAROS." *International Journal of Advanced Robotic Systems* 15.1 (2018); 6 pages.

Milgram, Paul, and Fumio Kishino. "A taxonomy of mixed reality visual displays." *IEICE Transactions on Information and Systems* 77.12 (1994): 1321-1329; 15 pages.

Microsoft. "Designing for Mixed Reality." Retrieved from https://docs.microsoft.com/en-us/windows/uwp/design/devices/designing-for-mr#feedback, Feb. 4, 2018; 9 pages.

* cited by examiner

SYSTEM AND METHOD OF UTILIZING AUGMENTED REALITY IN VARIOUS CONTEXTS

BACKGROUND

Field of the Disclosure

This disclosure relates generally to information handling systems and more particularly to utilizing information handling systems with augmented reality.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, method, and/or processes may load first multiple policy settings from a policy file; may determine, via one or more sensors, one or more of a location and a physical context of a user; may determine a security level based at least on the first multiple policy settings and the one or more of the location and the physical context of the user; may receive data via a wireless interface; and may determine, based at least on the security level, if the data shall be displayed within a first amount of time. If the data shall be displayed within the first amount of time, the one or more systems, method, and/or processes may determine, based at least on the first multiple policy settings and the one or more of the location and the physical context of the user, a first portion of a display to display the data; and may display the data via the first portion of the display. If the data shall not be displayed within the first amount of time, the one or more systems, method, and/or processes may determine, based at least on the first policy settings and the one or more of the location and the physical context of the user, information associated with the data; may determine, based at least on the first multiple policy settings and the one or more of the location and the physical context of the user, a second portion of the display to display the information associated with the data; and may display the information associated with the data via the second portion of the display.

In one or more embodiments, the information associated with the data may indicate that the data has been received. In one or more embodiments, the display may be configured to be worn by the user. In one or more embodiments, the display may be configured to display the data or the information on a windshield of a vehicle. In one or more embodiments, the one or more systems, method, and/or processes may further determine, based at least on the data, the first multiple policy settings, and the one or more of the location and the physical context of the user, an issue associated with the data. In one example, determining, based at least on the first multiple policy settings and the one or more of the location and the physical context of the user, the information associated with the data may be further based at least on the issue associated with the data. For instance, the issue associated with the data may potentially endanger the user. In another example, displaying the information associated with the data via the second portion of the display may include indicating the issue associated with the data.

In one or more embodiments, the one or more systems, method, and/or processes may further determine, based at least on the data, the first multiple policy settings, and the one or more of the location and the physical context of the user, an issue associated with the data, and based at least on the one or more of the location and the physical context of the user, the one or more systems, method, and/or processes may further contravene the issue associated with the data. For example, the one or more systems, method, and/or processes may contravene the issue associated with the data by determining the first portion of the display to display the data and displaying the data via the first portion of the display. In one instance, the one or more systems, method, and/or processes may contravene the issue associated with the data based at least on user input. In another instance, the one or more systems, method, and/or processes may automatically contravene the issue associated with the data. In one or more embodiments, the one or more systems, method, and/or processes may further receive user input associated with the data; may further determine second multiple policy settings based at least on the user input associated with the data; and may further store the second multiple policy settings via the policy file. In one or more embodiments, the one or more sensors include one or more cameras. For example, the one or more systems, method, and/or processes may further determine, via the one or more cameras, a hazard that is proximate to the user. For instance, determining the security level may be further based on the hazard that is proximate to the user.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
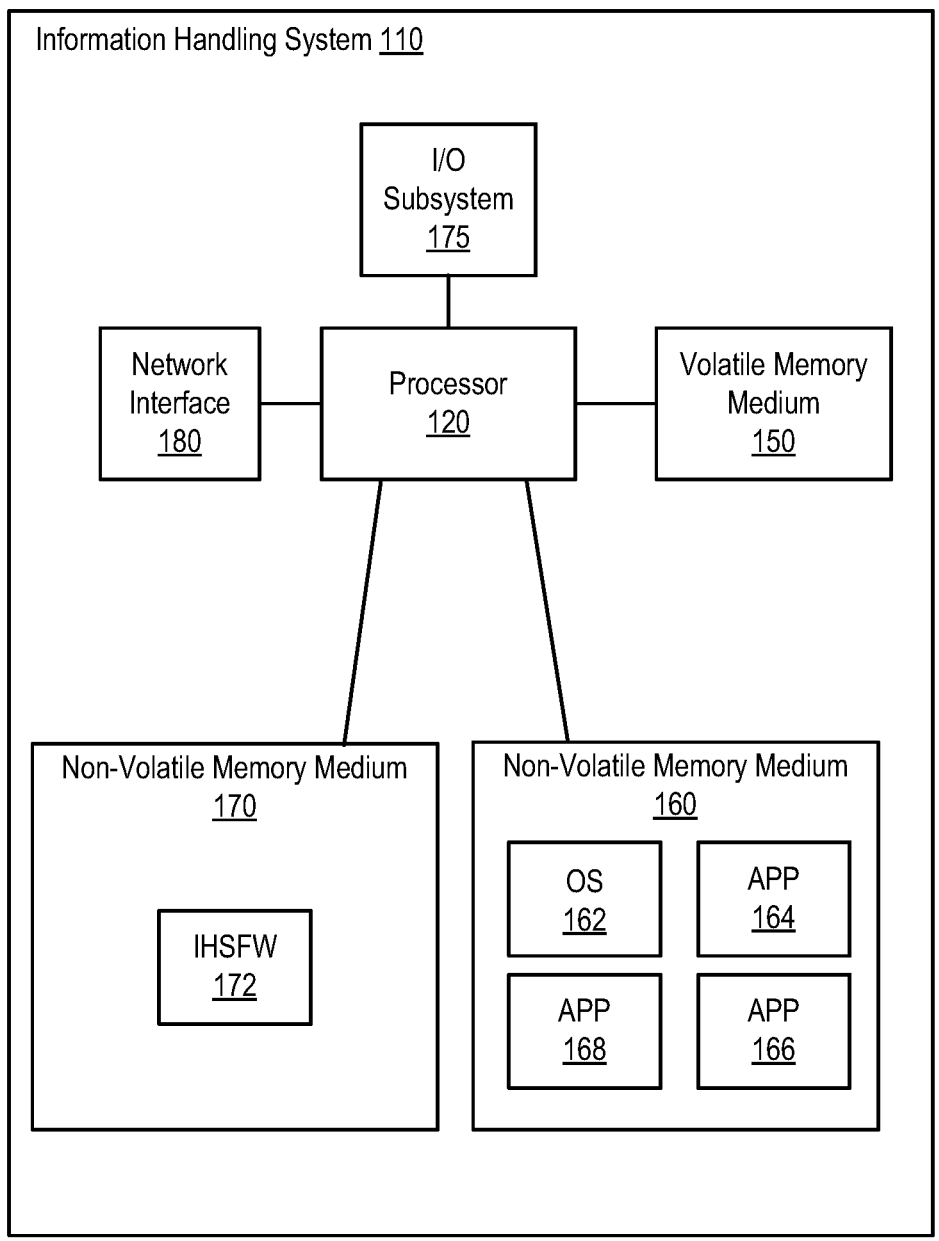
FIG. 1A illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, augmented reality (AR) may include providing components of a digital world to a perception of a person. For example, AR may display data and/or provide content that may be perceived, by the person, as one or more portions of an environment. For instance, AR may be utilized in enhancing one or more real-world environments and/or situations by providing enhanced and/or enriched experiences to the person. In one or more embodiments, AR may provide information associated with one or more environments. For example, AR may utilize one or more of computer vision and object recognition, among others, in providing information associated with one or more environments. For instance, the person may interact with and/or manipulate the information associated with the one or more environments. In one or more embodiments, AR may include one or more interactive experiences of one or more real-world environments, where the one or more interactive experiences may be augmented by one or more machine-generated perceptual information. For example, the one or more machine-generated perceptual information may include one or more of visual machine-generated perceptual information, auditory machine-generated perceptual information, haptic machine-generated perceptual information, somatosensory machine-generated perceptual information, and olfactory machine-generated perceptual information, among others.

In one or more embodiments, machine-generated perceptual information may include overlaid sensory information. In one example, the overlaid sensory information may be constructive. For instance, the overlaid sensory information may be additive to a real-world environment. In another example, the overlaid sensory information may be destructive. For instance, the overlaid sensory information may mask one or more portions of a real-world environment. In one or more embodiments, AR may alter one or more perceptions of a real-world environment. In one or more embodiments, one or more systems, methods, and/or processes may secure one or more augmented realities (ARs). In one example, a user may utilize a display, and one or more systems, methods, and/or processes may secure data provided to the display. In another example, a user may receive data from a network, and one or more systems, methods, and/or processes may secure the data received from the network.

In one or more embodiments, securing one or more ARs may provide various advantages. For example, a user may be utilizing AR when operating a vehicle. For instance, the vehicle may be or include one or more of an automobile, an airplane, a train, a boat, and a bicycle, among others. In one or more embodiments, the vehicle may be remotely operated by the user utilizing AR. In one or more embodiments, a user may be utilizing AR when walking or running. In one or more embodiments, multiple security levels may be utilized. For example, utilizing the multiple security levels may protect AR users, and others, from deceptive content, discomforting content, and/or harmful content, among others. For instance, an output policy module may filter and/or may constrain content.

In one or more embodiments, one or more of a conditional predicate and a binary expression, among others, may determine when a policy is applied. For example, an output policy may perform one or more actions if a premise associated with the policy affirmatively evaluates. In one instance, the premise may be or include a binary expression. In a second instance, the premise may be or include a delay (e.g., an amount of time transpiring). In another instance, the premise may be probability based. In one or more embodiments, a probability based premise may be or include a weighted sum. In one or more embodiments, a probability based premise may be or include a statistical inference. For example, the statistical inference may be or include a Bayesian inference.

Table 1 shows various security levels, according to one or more embodiments.

TABLE 1

| Identifier | Brief Description | May Apply to | Premise type |
| --- | --- | --- | --- |
| Security Level 1 | Abrupt movement of AR objects may be avoided | Walking, Display, etc. | Binary |
| Security Level 2 | Place AR objects may be at a comfortable viewing distance from a user | Movement, Static, etc. | Probability-based |
| Security Level 3 | May allow/permit a user to see the real world in the background | Walking, Static, etc. | Binary (e.g., document blocking, warning for AR etc.) |

TABLE 1-continued

| Identifier | Brief Description | May Apply to | Premise type |
| --- | --- | --- | --- |
| Security Level 4 | May avoid content that is "head-locked" (e.g., at a fixed location in the display) | Display, etc. | Delay/Probability-based (e.g., expected information characteristics overlay) |
| Security Level 5 | May not display text messages, social media, etc. while in motion | Running, Moving, etc. | Binary |
| Security Level 6 | May not obscure pedestrians, road signs, etc. | Walking, Running, and/or Moving | Binary |
| Security Level 7 | May disable user input on translucent AR objects | Walking, Inspection, Static, etc. | Delay |
| Security Level 8 | May not allow/permit AR objects to occlude other AR and/or projected objects | Walking, Static, Gaming, etc. | Delay |

In one or more embodiments, a user may override a security level. In one or more embodiments, a security level may be overridden and/or contravened based at least on one or more of a location of the user and the physical context of the user, among others. For example, the user may be at a location where an issue, which may have invoked the security level, may be automatically overridden and/or contravened as endangering the user based at least on the one or more of the location of the user and the physical context of the user, among others. In one instance, the user may not be moving at a speed that would be fast enough to endanger the user. In another instance, the user may be in an environment where the issue with the data may not endanger the user. In one or more embodiments, based at least on the one or more of the location and the physical context of the user, the issue associated with the data may be contravened by determining a portion of a display to display data and displaying the data via the portion of the display.

In one or more embodiments, one or more systems, methods, and/or processes may acquire movement associated with an eye of a user. In one example, the movement associated with the eye of the user may include pupil movement. In another example, the movement associated with the eye of the user may include blinking. In one or more embodiments, the movement associated with the eye of the user may be determined utilizing infrared (IR) light. For example, IR light may be provided to the eye of the user. For instance, one or more light sensors may receive IR light reflected from one more portions of the eye of the user and/or one or more features associated with the eye of the user, among others. In one or more embodiments, one or more light sensors may include one or more cameras, one or more photo cells, and/or one or more image sensors, among others.

In one or more embodiments, computer stereo vision may be utilized. For example, computer stereo vision may include extracting three-dimensional information from multiple images. For instance, the multiple images may be acquired from respective multiple cameras. In one or more embodiments, three-dimensional information may be extracted by comparing information associated with a scene from multiple vantage points. For example, comparing the information associated with the scene from the multiple vantage points may include examining and/or comparing relative positions of objects in the multiple images. In one or more embodiments, computer stereo vision may include two cameras at two different positions. For example, the two cameras may be located horizontally from one another. For instance, the two cameras may acquire respective differing views on a scene. In one or more embodiments, comparing images from the two cameras may provide relative depth information. For example, relative depth information may be determined in a form of a disparity map. For instance, the disparity map may encode differences in horizontal coordinates of corresponding image points. In one or more embodiments, values of the disparity map may be proportional to a scene depth at a corresponding pixel location. In one or more embodiments, a disparity map may be projected into a three-dimensional point cloud. For example, utilizing projective parameters of the cameras, the three-dimensional point cloud may be determined such that the three-dimensional point cloud may provide measurements at a known scale.

In one or more embodiments, a scene may include textured objects. For example, the textured objects may include poorly textured objects. For instance, the poorly textured objects may be visible via heavy occlusions, drastic light changes, and/or changing backgrounds, among others. In one or more embodiments, the poorly textured objects may be acquired from a moving vehicle and/or walking in a wooded area. In one or more embodiments, hazard and/or security status may be prone to malfunction and/or failure based at least on a lack of texture and/or ambiguous, repetitive patterns present in a scene acquired while one or more cameras are moving quickly. For example, hazard and/or security status may be prone to malfunction and/or failure further based at least on low light.

In one or more embodiments, computer stereo vision may be utilized in determining one or more hazards. For example, a three-dimensional point cloud may be utilized in determining one or more hazards. For instance, the three-dimensional point cloud may provide measurements at a known scale, which may be utilized in alerting a user and/or increasing a security level. In one or more embodiments, measurements at a known scale may be utilized in determining a distance and/or a size of a poorly textured object. For example, the poorly textured object may be identified as a hazard. In one instance, one or more systems, methods, and/or processes may provide an alert may to the user based at least on the poorly textured object identified as a hazard and/or one or more of a distance and/or a size of a poorly textured object. In another instance, one or more systems, methods, and/or processes may increase a security level based at least on the poorly textured object identified as a hazard and/or one or more of a distance and/or a size of a poorly textured object.

In one or more embodiments, one or more systems, methods, and/or processes may increase a security level based at least on a physical context of a user. For example, a security level may be increased based at least on a physical context of a user determined via one or more biometric determinations associated with the user. In one or more embodiments, one or more physical contexts of the user may be determined based at least on one or more movements associated with the eye of the user. In one example, a physical context of the user may include a level of fatigue of the user, which may be determined based at least on one or more movements associated with the eye of the user. In another example, a physical context of the user may include a level of stress of the user, which may be determined based at least on one or more movements associated with the eye of the user. In one or more embodiments, one or more physical contexts of the user may be determined based at least on an amount of time that may be utilized for a user to complete a task. For example, a physical context of the user may include a level of stress and/or a level of fatigue, among others, based at least on an amount of time that may be utilized for the user to complete the task.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I²C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, flowcharts, methods, and/or processes described herein. In one example, processor 120 may execute processor instructions from one or more of memory media 150-170 in implementing one or more systems, flowcharts, methods, and/or processes described herein. In another example, processor 120 may execute processor instructions via network interface 180 in implementing one or more systems, flowcharts, methods, and/or processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 1B:
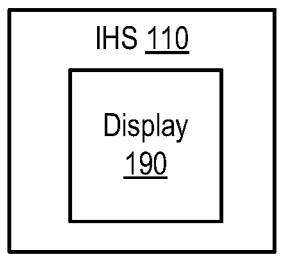
FIGS. 1B-1E illustrate examples of an information handling system and one or more displays, according to one or more embodiments.
Figure 1C:
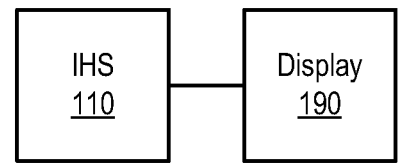
Figure 1D:
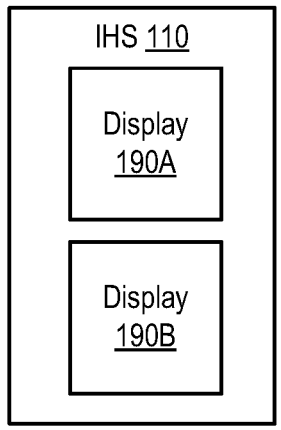
Figure 1E:
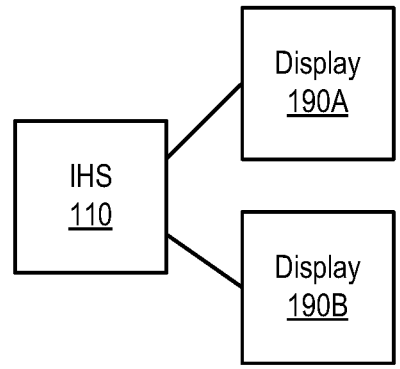

Turning now to FIGS. 1B-1E, examples of an information handling system and one or more displays are illustrated, according to one or more embodiments. As shown in FIG. 1B, IHS 110 may include a display 190. As illustrated in FIG. 1C, IHS 110 may be communicatively coupled to display 190. In one or more embodiments, display 190 may be external to IHS 110. As shown in FIG. 1D, IHS 110 may include displays 190A and 190B. As illustrated in FIG. 1E, IHS 110 may be communicatively coupled to displays 190A and 190B. In one or more embodiments, displays 190A and 190B may be external to IHS 110. Although not specifically illustrated, a display 190 may be communicatively coupled to processor 120.

Figure 2A:
FIG. 2A illustrates examples of a transparent material and one or more displays, according to one or more embodiments.

Turning now to FIG. 2A, examples of a transparent material and one or more displays are illustrated, according to one or more embodiments. As shown, a transparent material 210A may include display 190. As illustrated, a transparent material 210B may include displays 190A and 190B.

Figure 2B:
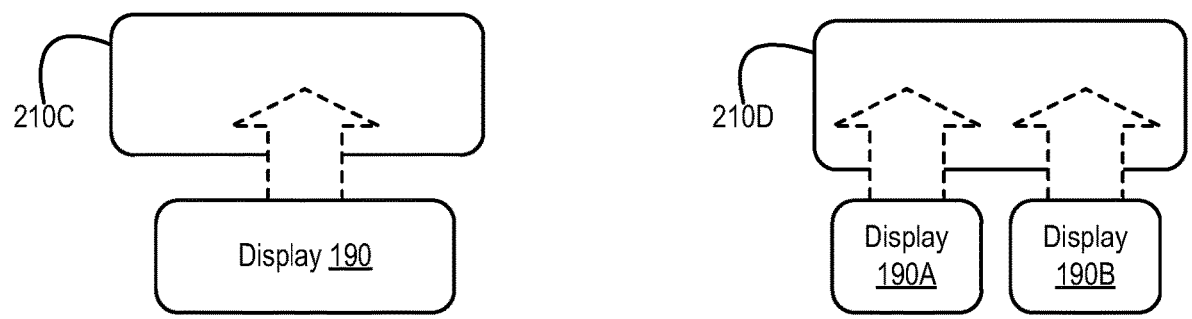
FIG. 2B illustrates other examples of a transparent material and one or more displays, according to one or more embodiments.

Turning now to FIG. 2B, other examples of a transparent material and one or more displays are illustrated, according to one or more embodiments. As shown, display 190 may provide light emissions to a transparent material 210C. In one or more embodiments, transparent material 210C may reflect light emissions from display 190. As illustrated, displays 190A and 190B may provide light emissions to a transparent material 210D. In one or more embodiments, transparent material 210D may reflect light emissions from displays 190A and 190B.

In one or more embodiments, transparent material 210 may be included by a vehicle. For example, transparent material 210 may be or may be included by a windshield of a vehicle. In one or more embodiments, transparent material 210 may be worn by a user. In one example, transparent material 210 may be included by a pair of glasses. In a second example, transparent material 210 may be included by a pair of goggles. In a second example, transparent material 210 may be included by a remote arm.

Figure 2C:
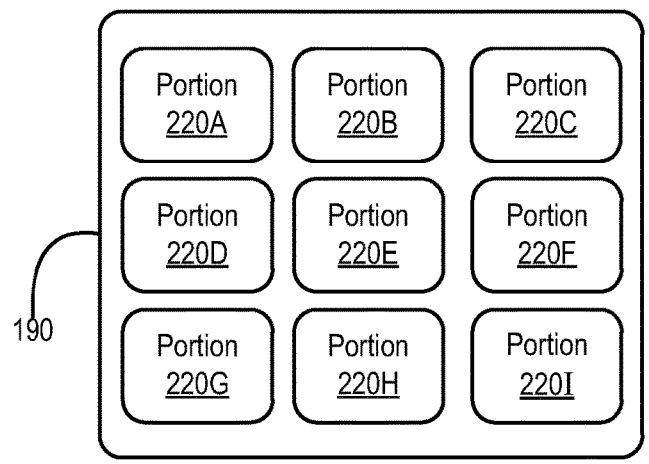
FIG. 2C illustrates an example of portions of a display, according to one or more embodiments.

Turning now to FIG. 2C, an example of portions of a display is illustrated, according to one or more embodiments. As shown, a display may include portions 220A-220I. In one or more embodiments, information may be provided to a user via one or more of portions 220A-220I. In one example, information may be provided to a user via portion 220E. For instance, portion 220E may be associated with a central view or a paracentral view of the user. In second example, information may be provided to a user via portion 220F. For instance, portion 220F may be associated with a peripheral view of the user. In another example, information may be provided to a user via portion 220G. For instance, portion 220G may be associated with a peripheral view of the user.

In one or more embodiments, display 190 may be included by a vehicle. For example, display 190 may be or may be included by a windshield of a vehicle. In one or more embodiments, display 190 may be worn by a user. In one example, display 190 may be included by a pair of glasses. In a second example, display 190 may be included by a pair of goggles. In another example, display 190 may be included by a remote arm.

Figure 3:
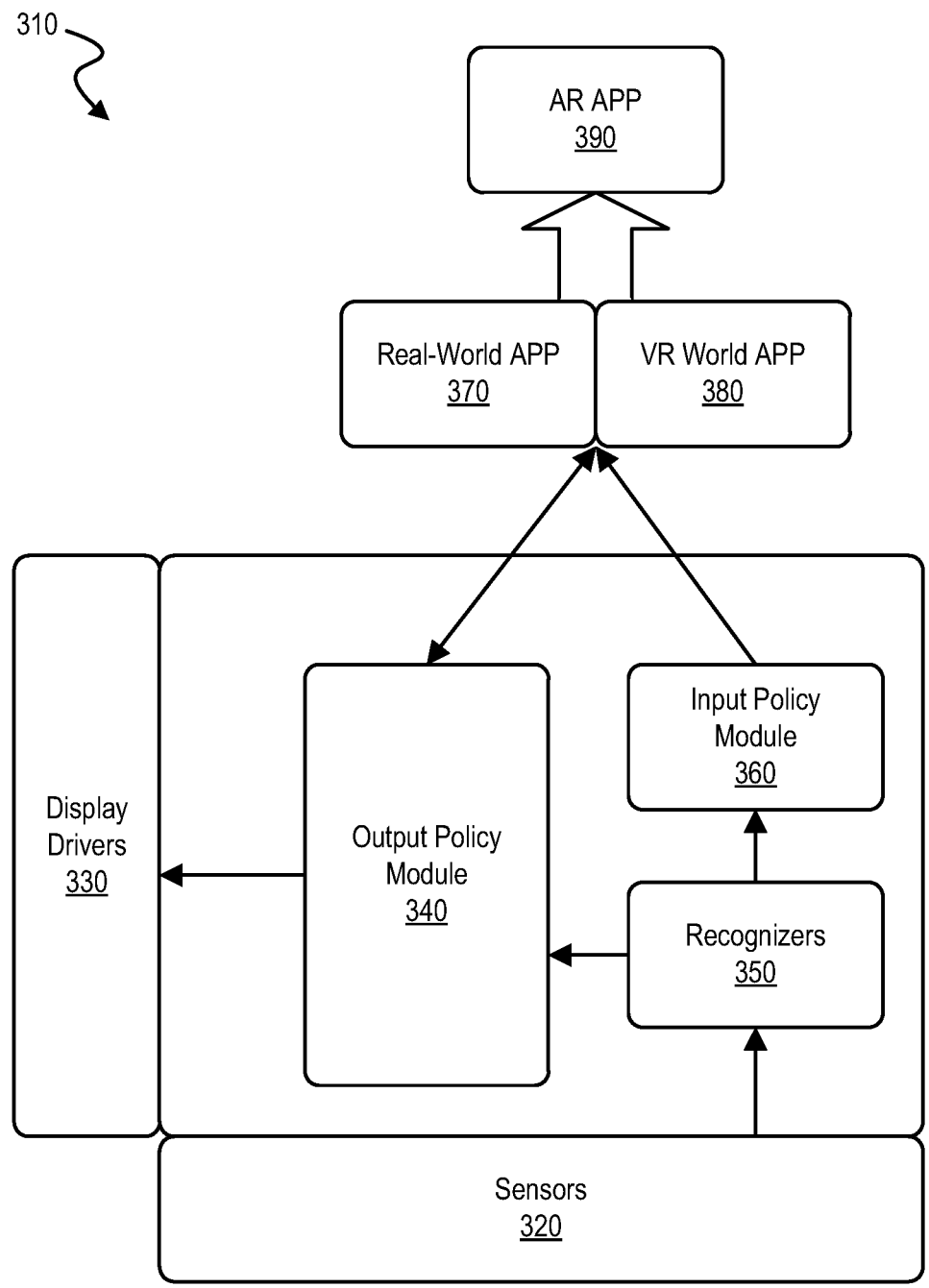
FIG. 3 illustrates an example of an augmented reality system, according to one or more embodiments.

Turning now to FIG. 3, an example of an augmented reality system is illustrated, according to one or more embodiments. As shown, an AR system 310 may include sensors 320. Although not specifically illustrated, one or more of sensors 320 may be communicatively coupled to processor 120, according to one or more embodiments. In one or more embodiments, one or more of sensors 320 may be coupled to transparent material 210. In one or more embodiments, one or more of sensors 320 may be included by transparent material 210. In one or more embodiments, IHS 110 may include one or more of sensors 320.

In one or more embodiments, sensors 320 may provide data to recognizers 350. In one example, one or more of sensors 320 may transform real-world phenomena to data. In another example, one or more of sensors 320 may transform radio frequency (RF) signals into data. For instance, a sensor of sensors 320 may be or include a global positioning system (GPS) receiver device. In one or more embodiments, data from sensors 320 may be processed by IHS 110. In one or more embodiments, recognizers 350 may determine one or more objects and/or one or more contexts, among others, based at least on data from sensors 320. For example, a sensor of sensors 320 may be or include an image sensor. For instance, the image sensor may be or include a camera.

In one or more embodiments, recognizers 350 may determine one or more gestures of a user. For example, a sensor of sensors 320 may be or include an image sensor. In one or more embodiments, recognizers 350 may determine words and/or one or more contexts, among others, based at least on data from sensors 320. For example, a sensor of sensors 320 may be or include a microphone. In one instance, the microphone may provide a signal based at least on a voice of a user. In another instance, the microphone may provide a signal based at least on environmental sounds of an environment associated with a user.

In one or more embodiments, recognizers 350 may include a computer vision system, method, and/or process. In one example, the computer vision system, method, and/or process may determine one or more objects. In another example, the computer vision system, method, and/or process may determine one or more distances between two or more objects. In one or more embodiments, recognizers 350 may determine a stationary context. For example, recognizers 350 may determine that a user is not moving for a period of time. In one or more embodiments, recognizers 350 may determine a moving context. For example, recognizers 350 may determine that a user is moving for a period of time.

In one or more embodiments, recognizers 350 may provide data to one or more of an output policy module 340 and an input policy module 360, among others. In one or more embodiments, output policy module 340 may provide data to one or more of display drivers 330, a real-world APP 370, and a VR world APP 380, among others. In one or more embodiments, output policy module 340 may determine, based at least on data from recognizers 350, information that one or more of display drivers 330, real-world APP 370, and VR world APP 380 may provide to a user. For example, output policy module 340 may determine, further based at least on one or more policy settings, the information that the one or more of display drivers 330, real-world APP 370, and VR world APP 380 may provide to the user.

In one or more embodiments, output policy module 340 may receive data from one or more of real-world APP 370 and VR world APP 380, among others. For example, the data from one or more of real-world APP 370 and VR world APP 380 may include user input. In one or more embodiments, the user input may be in response to information provided to the user. In one or more embodiments, display drivers 330 may provide data to a display 190. For example, a display 190 may provide information, based at least one the data from display drivers 330, to the user. In one or more embodiments, real-world APP 370 and VR world APP 380 may be converged into an AR APP 390. For example, a user may receive information from and/or provide user input to AR APP 390. In one or more embodiments, AR APP 390 may be or include a mixed world APP. In one or more embodiments, IHS 110 may include and/or implement augmented reality system 310.

Figure 4A:
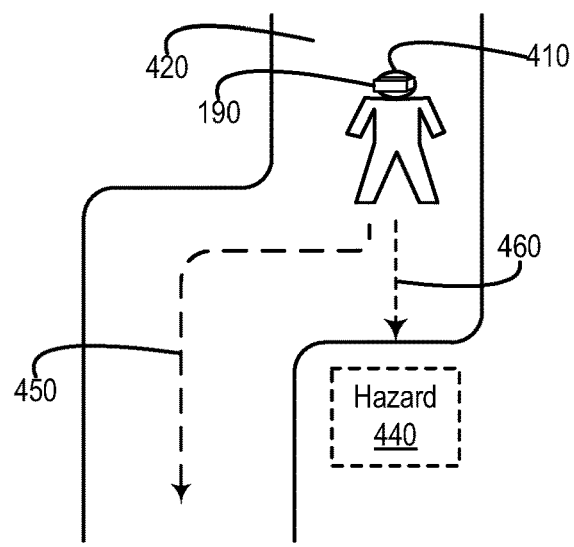
FIG. 4A illustrates an example of a user utilizing augmented reality within an environment, according to one or more embodiments.

Turning now to FIG. 4A, an example of a user utilizing augmented reality within an environment is illustrated, according to one or more embodiments. As show, a user 410 may be traveling a pathway 420. As illustrated, user 410 may be utilizing display 190. For example, user 410 may be wearing display 190. As shown, pathway 420 may be proximate to a hazard 440. In one or more embodiments, hazard 440 may be unsafe, dangerous, hazardous, and/or harmful to user 410. For example, hazard 440 may be or include a fence, a body of water, a river, a cliff, a wall, a wooded area, etc. In one or more embodiments, AR APP 390 may provide a path to user 410. In one example, AR APP 390 may provide a path 450 to user 410 via display 190. For instance, path 450 may avoid hazard 440. In another example, AR APP 390 may provide a path 460 to user 410 via display 190. For instance, path 460 may not avoid hazard 440.

In one or more embodiments, path 460 may be provided to user 410 due to one or more errors and/or one or more malicious endeavors. In one example, a sensor may be malfunctioning or may have failed. In a second example, a sensor may not receive a requisite number of signals. For instance, the sensor may include a GPS receiver device, and the GPS receiver device may not receive a requisite number of signals. In a third example, a sensor may be provided inaccurate signals or deceptive signals. For instance, the sensor may receive inaccurate magnetic fields. In a fourth example, the sensor may include a GPS receiver device, and the GPS receiver device may receive inaccurate signals or deceptive signals. In one instance, a malfunctioning differential GPS transmitter may provide inaccurate signals. In another instance, a GPS jamming device may provide inaccurate signals or deceptive signals. In another example, IHS 110 may receive faulty data or false data. In one instance, the data may be corrupted. In a second instance, the data may include specifically malicious data and/or falsified data. In another instance, malicious data may be injected into a data stream for AR APP 390. In one or more embodiments, AR APP 390 may not provide path 460. For example, even if a scenario occurs where AR APP 390 would have provided path 460 to user 410, AR APP 390 may not provide path 460 based at least on one or more security levels.

Figure 4B:
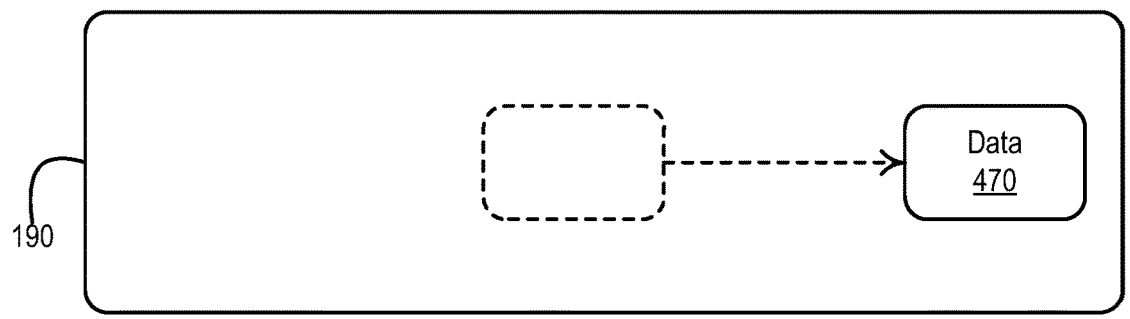
FIG. 4B illustrates an example of displaying information, according to one or more embodiments.

Turning now to FIG. 4B, an example of displaying information is illustrated, according to one or more embodiments. As shown, data 470 may be displayed to a side of display 190 rather than via a central portion of display 190. For example, portion 220F may display data 470 rather than portion 220E. In one or more embodiments, displaying data 470 may be displayed to a side of display 190 may be based at least on a security level. In one or more embodiments, displaying data 470 may be displayed to a side of display 190 may be based at least on a physical context of a user. For example, the user may be operating a vehicle. For instance, displaying data 470 a side of display 190 may place data 470 in a peripheral vision of the user.

Figure 4C:
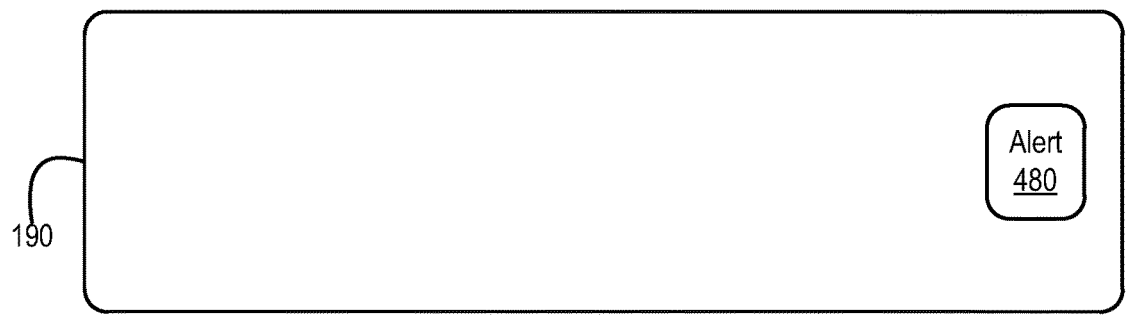
FIG. 4C illustrates an example of displaying an alert, according to one or more embodiments.

Turing now to FIG. 4C, an example of displaying an alert is illustrated, according to one or more embodiments. As shown, an alert 480 may be displayed to a side of display 190. For example, alert 480 may be displayed to a side of display 190 rather than data 470. For instance, displaying alert 480 may be less distracting than data 470. In one or more embodiments, alert 480 may be displayed rather than data 470 based at least on a security level and/or a physical context of the user.

Figure 5:
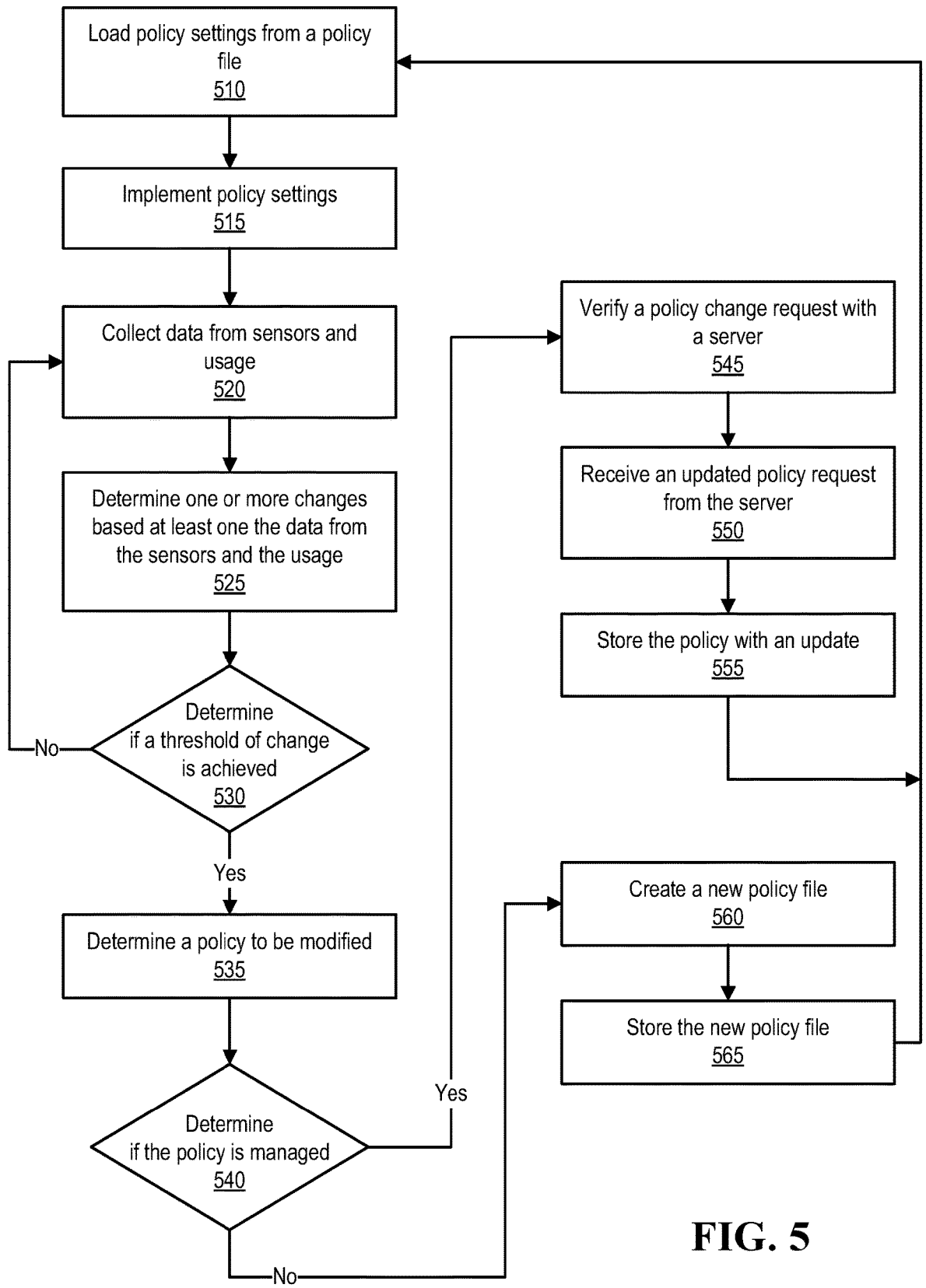
FIG. 5 illustrates an example of a method of operating an augmented reality system, according to one or more embodiments.

Turning now to FIG. 5, an example of a method of operating an augmented reality system is illustrated, according to one or more embodiments. At 510, policy settings may be loaded from a policy file. In one example, the policy file may be stored locally. In another example, the policy file may be stored remotely. For instance, the policy settings may be loaded via a network. At 515, the policy settings may be implemented. For example, output policy module 340 may implement the policy settings. At 520, data may be collected from sensors and usage. In one example, data may be collected from sensors 320. In another example, data may be collected from usage of augmented reality system 310. For instance, usage of the augmented reality system may include user input.

At 525, one or more changes base at least on the data from the sensors and the usage may be determined. In one example, if the augmented reality system displays text messages while the user is moving (e.g., a moving context) and user input indicates that the text messages are not displayed, a change may include not displaying a text message while the user is moving. In another example, if the user is associated with a possible dangerous context and the user indicates that navigation information is not to be displayed, a change may include not displaying navigation information while the user is associated with the possible dangerous context.

530, it may be determined if a threshold of change is achieved. For example, a threshold of change may include a number of changes. In one or more embodiments, a threshold of change may configurable. For example, a threshold of change may configurable by a user. If a threshold of change is not achieved, the method may proceed to 520, according to one or more embodiments. If a threshold of change is achieved, a policy to be modified may be determined, at 535.

At 540, it may be determined if the policy is managed. For example, if a policy is managed, the policy may be modifiable. If the policy is managed, a policy change request may be verified with a server, at 545. At 550, an updated policy request may be received from the server. At 555, the policy with an update may be stored. In one example, the policy with an update may be stored locally. In another example, the policy with an update may be stored remotely. In one instance, the policy with an update may be stored via a network. In another instance, the policy with an update may be stored via the server. If the policy is not managed, a new policy may be created, at 560. At 565, the new policy may be stored. In one example, the new policy may be stored locally. In another example, the policy with an update may be stored remotely. In one instance, the new policy may be stored via a network. In another instance, the new policy may be stored via the server.

Figure 6:
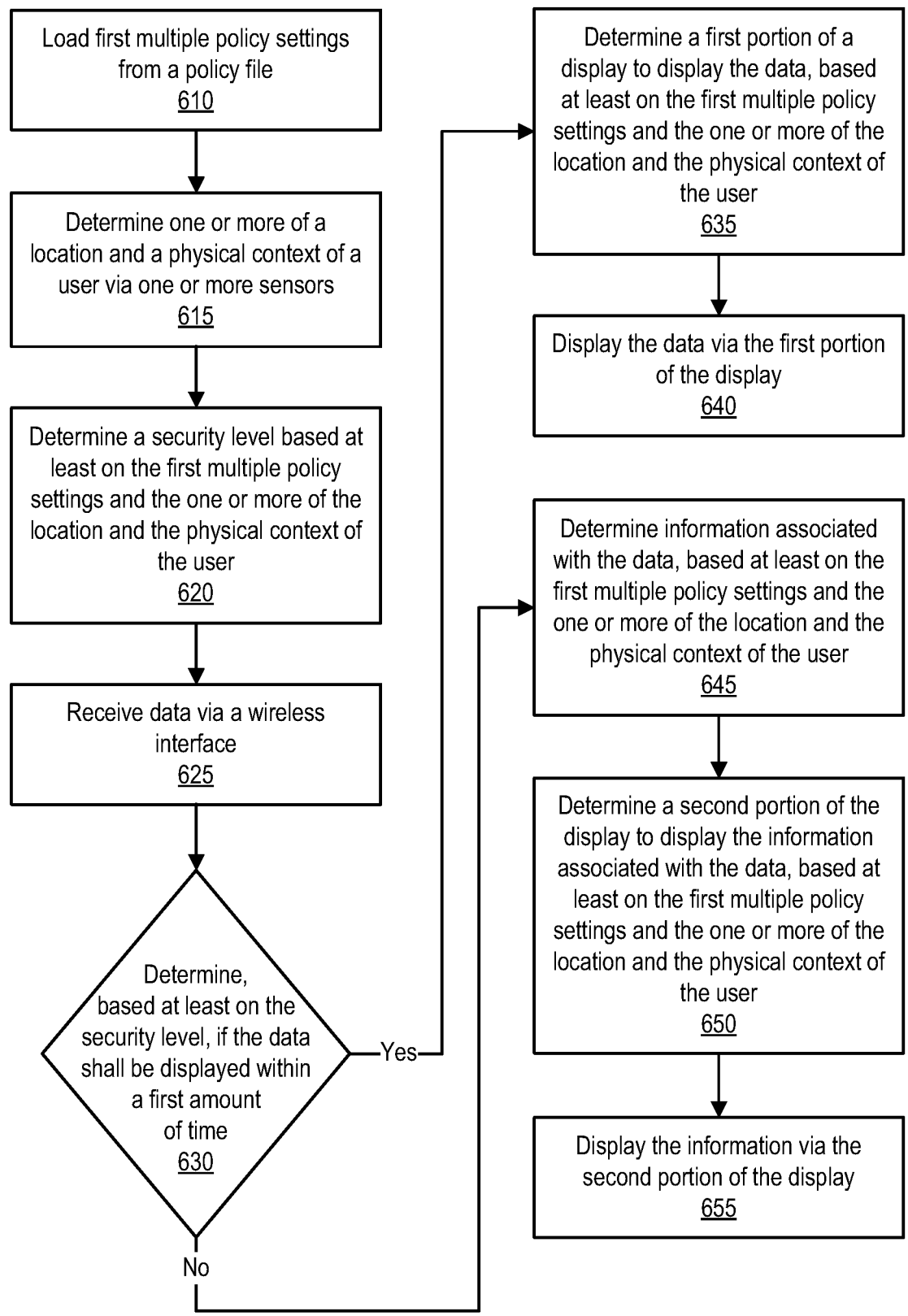
FIG. 6 illustrates an example of another method of operating an augmented reality system, according to one or more embodiments.

Turning now to FIG. 6, an example of another method of operating an augmented reality system is illustrated, according to one or more embodiments. At 610, first multiple policy settings may be loaded from a policy file. In one example, the policy file may be stored locally. In another example, the policy file may be stored remotely. For instance, the policy settings may be loaded via a network.

At 615, one or more of a location and a physical context of a user may be determined via one or more sensors. In one example, a location of a user may be determined. In one instance, the one or more sensors may include a GPS receiver device that may determine a location of a user. In another instance, a network interface may be utilized as a sensor of the one or more sensors may include, which may determine a location based at least on a network identification (e.g., a network address, a network name, etc.). In another example, a physical context of a user may be determined. In one instance, the one or more sensors may include an accelerometer that may determine one or more motions and/or one or more measurements of one or more motions, which may be utilized in determining a physical context of a user. In a second instance, the one or more sensors may include an image sensor, which may be utilized in determining a physical context of a user. In a third instance, the one or more sensors may include a light level sensor, which may be utilized in determining a physical context of a user. In a fourth instance, the one or more sensors may include a microphone, which may be utilized in determining a physical context of a user. In a fifth instance, the one or more sensors may include a RADAR (RAdio Detection And Ranging), which may be utilized in determining a physical context of a user. In a sixth instance, the one or more sensors may include a SONAR (SOund Navigation And Ranging), which may be utilized in determining a physical context of a user. In a seventh instance, the one or more sensors may include a LIDAR (Light Detection And Ranging), which may be utilized in determining a physical context of a user.

At 620, a security level may be determined based at least on the first multiple policy settings and the one or more of the location and the physical context of the user. At 625, data may be received via a wireless interface. In one or more embodiments, the wireless interface may be or include one or more of a wireless network interface, a Bluetooth interface, a wireless Ethernet interface, a Wi-Fi interface, an IEEE 802.11 interface, an IEEE 802.15 interface, an IEEE 802.15.4 interface, a Zigbee interface, a 6LowPAN interface, and a Wi-gig interface, among others. At 630, it may be determined, based at least on the security level, if the data shall be displayed within a first amount of time.

If the data shall be displayed within the first amount of time, a first portion of a display to display the data may be determined based at least on the first multiple policy settings and the one or more of the location and the physical context of the user, at 635. For example, the first portion of the display may be or include a portion of portions 220A-220I of display 190. At 640, the data may be displayed via the first portion of the display. For example, data 470 may be displayed.

If the data shall not be displayed within the first amount of time, information associated with the data may be determined based at least on the first multiple policy settings and the one or more of the location and the physical context of the user, at 645. In one example, the information associated with the data may indicate that the data has been received. In one instance, the information that indicates that the data has been received may include text. In another instance, the information that indicates that the data has been received may include one or more graphics. In a second example, the information associated with the data may indicate an issue with the data. For instance, the issue associated with the data may potentially endanger the user or other one or more persons. In one or more embodiments, the issue associated with the data may be determined based at least on the data, the first multiple policy settings, and the one or more of the location and the physical context of the user.

At 650, a second portion of the display to display the information associated with the data may be determined based at least on the first multiple policy settings and the one or more of the location and the physical context of the user. For example, the second portion of the display may be or include a portion of portions 220A-220I of display 190. In one instance, the second portion of the display may be different from the first portion of the display. In another instance, the second portion of the display may be the first portion of the display.

At 655, the information associated with the data may be displayed via the second portion of the display. In one example, the information associated with the data may be or include an alert. For instance, the alert may be or include alert 480. In a second example, the information associated with the data may be or include a portion of the data. In one instance, the information may include information associated with a sender of the data. In another instance, the information may be or include a summary of the data.

In one or more embodiments, the information associated with the data may be displayed based at least on an issue with the data. For example, it may be determined, based at least on the data, the first multiple policy settings, and the one or more of the location and the physical context of the user, an issue associated with the data. For instance, alert 480 may indicate that there is or may be an issue with the data. In another example, the information associated with the data may be or include the issue associated the data. In one or more embodiments, determining, based at least on the first multiple policy settings and the one or more of the location and the physical context of the user, the information associated with the data is further based at least on the issue associated with the data. In one or more embodiments, the issue associated with the data may potentially endanger the user.

In one or more embodiments, the issue associated with the data may be contravened, based at least on the one or more of the location and the physical context of the user, among others. For example, the issue associated with the data may be contravened by performing method elements 635 and 640, among others. In one or more embodiments, the issue associated with the data may be contravened based at least on learned policy settings. For example, the learned policy settings may be determined via one or more machine learning systems, methods, and/or processes. For instance, the issue associated with the data may be automatically contravened based at least on the learned policy settings. In one or more embodiments, the one or more machine learning systems, methods, and/or processes may utilize one or more inputs, such as one or more of user interaction with data, user interaction with information, and physical contexts of the user, among others.

In one or more embodiments, user input associated with the data may be received. For example, second multiple policy settings based at least on the user input associated with the data may be determined. In one or more embodiments, the second multiple policy settings may be stored. In one example, the second multiple policy settings may be stored locally. For instance, IHS 110 may store the second multiple policy settings. In a second example, the second multiple policy settings may be stored remotely. In one instance, the second multiple policy settings may be stored via a remote information handling system, via a network. In another instance, the second multiple policy settings may be stored via a cloud storage, via a network. In one or more embodiments, the user input may indicate where future data may be displayed. In one example, portion 220E may display data to the user, and the user input may indicate that future data is to be displayed via a portion of portions 220A-220D and portions 220F-220I. In another example, one or more of portion of portions 220A-220I may display data to the user, and the user input may indicate that future data may be represented via an alert.

In one or more embodiments, the user input may indicate a context associated with displaying future data. In one example, the user input may indicate a first context associated with displaying future data. In one instance, the first context may include operating a vehicle, and alerts may be displayed when the user is associated with the first context. In another example, the first context may include operating a vehicle, and future data may be displayed, rather than alerts associated with the future data. In another example, a second context may include being stationary. For instance, the user input may indicate that future data is displayed, rather than alerts associated with the future data.

In one or more embodiments, the issue associated with the data may be contravened based at least on the one or more of the location and the physical context of the user. In one example, the user may be at a location where the issue with the data may not endanger the user. In another example, the issue associated with the data may not endanger the user based at least on the physical context of the user. In one instance, the user may not be moving at a speed that would be fast enough to endanger the user. In another instance, the user may be in an environment where the issue with the data may not endanger the user. In one or more embodiments, based at least on the one or more of the location and the physical context of the user, the issue associated with the data may be contravened by performing determining the first portion of the display to display the data and displaying the data via the first portion of the display.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, systems, methods, and/or processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor; and
   a memory medium, coupled to the at least one processor, that stores instructions executable by the at least one processor, which when executed by the at least one processor, cause the information handling system to:
   load a first plurality of policy settings from a policy file;
   determine, via one or more sensors, one or more of a location and a physical context of a user;
   determine a security level based at least on the first plurality of policy settings and the one or more of the location and the physical context of the user;
   receive data via a wireless interface;
   determine, based at least on the security level, if the data shall be displayed within a first amount of time;
   if the data shall be displayed within the first amount of time:
      determine, based at least on the first plurality of policy settings and the one or more of the location and the physical context of the user, a first portion of a display to display the data; and
      display the data via the first portion of the display; and
   if the data shall not be displayed within the first amount of time:
      determine, based at least on the first plurality of policy settings and the one or more of the location and the physical context of the user, information associated with the data;
      determine, based at least on the first plurality of policy settings and the one or more of the location and the physical context of the user, a second portion of the display to display the information associated with the data; and
      display the information associated with the data via the second portion of the display.

2. The information handling system of claim 1, wherein the information associated with the data indicates that the data has been received.

3. The information handling system of claim 1, wherein the instructions further cause the information handling system to:
   determine, based at least on the data, the first plurality of policy settings, and the one or more of the location and the physical context of the user, an issue associated with the data;
   wherein, to determine, based at least on the first plurality of policy settings and the one or more of the location and the physical context of the user, the information associated with the data is further based at least on the issue associated with the data; and
   wherein, to display the information associated with the data via the second portion of the display, the instructions further cause the information handling system to indicate the issue associated with the data.

4. The information handling system of claim 3, wherein the issue associated with the data potentially endangers the user.

5. The information handling system of claim 1, wherein the instructions further cause the information handling system to:
   determine, based at least on the data, the first plurality of policy settings, and the one or more of the location and the physical context of the user, an issue associated with the data; and
   based at least on the one or more of the location and the physical context of the user, contravene the issue associated with the data, wherein, to contravene the issue associated with the data, he instructions further cause the information handling system to:
      determine the first portion of the display to display the data; and
      display the data via the first portion of the display.

6. The information handling system of claim 1, wherein the instructions further cause the information handling system to:
   receive user input associated with the data;
   determine a second plurality of policy settings based at least on the user input associated with the data; and
   store the second plurality of policy settings via the policy file.

7. The information handling system of claim 1,
   wherein the one or more sensors include one or more cameras;
   wherein the instructions further cause the information handling system to determine, via the one or more cameras, a hazard that is proximate to the user; and
   wherein, to determine the security level based at least on the first plurality of policy settings and the one or more of the location and the physical context of the user, the instructions further cause the information handling system to determine the security level further based at least on the hazard that is proximate to the user.

8. A method, comprising:
   loading a first plurality of policy settings from a policy file;
   determining, via one or more sensors, one or more of a location and a physical context of a user;

19 determining a security level based at least on the first plurality of policy settings and the one or more of the location and the physical context of the user;
receiving data via a wireless interface;
determining, based at least on the security level, if the data shall be displayed within a first amount of time;
if the data shall be displayed within the first amount of time:
  determining, based at least on the first plurality of policy settings and the one or more of the location and the physical context of the user, a first portion of a display to display the data; and
  displaying the data via the first portion of the display; and
if the data shall not be displayed within the first amount of time:
  determining, based at least on the first plurality of policy settings and the one or more of the location and the physical context of the user, information associated with the data;
  determining, based at least on the first plurality of policy settings and the one or more of the location and the physical context of the user, a second portion of the display to display the information associated with the data; and
  displaying the information associated with the data via the second portion of the display.

9. The method of claim 8, wherein the information associated with the data indicates that the data has been received.

10. The method of claim 8, further comprising:
determining, based at least on the data, the first plurality of policy settings, and the one or more of the location and the physical context of the user, an issue associated with the data;
wherein the determining, based at least on the first plurality of policy settings and the one or more of the location and the physical context of the user, the information associated with the data is further based at least on the issue associated with the data; and
wherein the displaying the information associated with the data via the second portion of the display includes indicating the issue associated with the data.

11. The method of claim 10, wherein the issue associated with the data potentially endangers the user.

12. The method of claim 8, further comprising:
determining, based at least on the data, the first plurality of policy settings, and the one or more of the location and the physical context of the user, an issue associated with the data; and
based at least on the one or more of the location and the physical context of the user, contravening the issue associated with the data by performing:
  the determining the first portion of the display to display the data; and
  the displaying the data via the first portion of the display.

13. The method of claim 8, further comprising:
receiving user input associated with the data;
determining a second plurality of policy settings based at least on the user input associated with the data; and
storing the second plurality of policy settings via the policy file.

14. The method of claim 8, wherein the display is configured to be worn by the user.

15. A computer-readable non-transitory memory medium that includes instructions that, when executed by at least one processor of an information handling system, cause the information handling system to:
  load a first plurality of policy settings from a policy file;
  determine, via one or more sensors, one or more of a location and a physical context of a user;
  determine a security level based at least on the first plurality of policy settings and the one or more of the location and the physical context of the user;
  receive data via a wireless interface;
  determine, based at least on the security level, if the data shall be displayed within a first amount of time;
  if the data shall be displayed within the first amount of time:
    determine, based at least on the first plurality of policy settings and the one or more of the location and the physical context of the user, a first portion of a display to display the data; and
    display the data via the first portion of the display; and
  if the data shall not be displayed within the first amount of time:
    determine, based at least on the first plurality of policy settings and the one or more of the location and the physical context of the user, information associated with the data;
    determine, based at least on the first plurality of policy settings and the one or more of the location and the physical context of the user, a second portion of the display to display the information associated with the data; and
    display the information associated with the data via the second portion of the display.

16. The computer-readable non-transitory memory medium of claim 15, wherein the information associated with the data indicates that the data has been received.

17. The computer-readable non-transitory memory medium of claim 15, wherein the instructions further cause the information handling system to:
  determine, based at least on the data, the first plurality of policy settings, and the one or more of the location and the physical context of the user, an issue associated with the data;
  wherein, to determine, based at least on the first plurality of policy settings and the one or more of the location and the physical context of the user, the information associated with the data is further based at least on the issue associated with the data; and
  wherein, to display the information associated with the data via the second portion of the display, the instructions further cause the information handling system to indicate the issue associated with the data.

18. The computer-readable non-transitory memory medium of claim 17, wherein the issue associated with the data potentially endangers the user.

19. The computer-readable non-transitory memory medium of claim 15, wherein the instructions further cause the information handling system to:
  determine, based at least on the data, the first plurality of policy settings, and the one or more of the location and the physical context of the user, an issue associated with the data; and
  based at least on the one or more of the location and the physical context of the user, contravene the issue associated with the data. wherein, to contravene the issue associated with the data, he instructions further cause the information handling system to:

determine the first portion of the display to display the data; and display the data via the first portion of the display.

20. The computer-readable non-transitory memory medium of claim 15, wherein the instructions further cause the information handling system to:

receive user input associated with the data;

determine a second plurality of policy settings based at least on the user input associated with the data; and store the second plurality of policy settings via the policy file.

\* \* \* \* \*